United States Patent
Le Garrec et al.

(10) Patent No.: US 8,540,162 B2
(45) Date of Patent: Sep. 24, 2013

(54) MICROCIRCUIT DEVICE INCLUDING A NEAR-FIELD COMMUNICATION ANTENNA CIRCUIT

(75) Inventors: Loïc Le Garrec, Vitre (FR); Agnès Duval, Vitre (FR)

(73) Assignee: Oberthur Technologies, Levallois Perret (FR)

( * ) Notice: Subject to any disclaimer, the term of this patent is extended or adjusted under 35 U.S.C. 154(b) by 14 days.

(21) Appl. No.: 13/197,686

(22) Filed: Aug. 3, 2011

(65) Prior Publication Data

US 2012/0037710 A1 Feb. 16, 2012

(30) Foreign Application Priority Data

Aug. 3, 2010 (FR) ...................................... 10 56398

(51) Int. Cl.
*G06K 19/06* (2006.01)

(52) U.S. Cl.
USPC .......................................................... 235/492

(58) Field of Classification Search
USPC ................................................ 235/492, 493
See application file for complete search history.

(56) References Cited

U.S. PATENT DOCUMENTS

| | | | |
|---|---|---|---|
| 7,762,471 B2 * | 7/2010 | Tanner | 235/492 |
| 7,871,007 B2 * | 1/2011 | Amiot et al. | 235/486 |
| 7,956,743 B2 * | 6/2011 | Mosteller | 340/572.1 |
| 8,336,784 B2 * | 12/2012 | Phillips | 235/492 |
| 2008/0277484 A1 * | 11/2008 | Launay et al. | 235/492 |
| 2009/0315799 A1 * | 12/2009 | Eray et al. | 343/788 |
| 2010/0147959 A1 * | 6/2010 | Tikhov et al. | 235/492 |

FOREIGN PATENT DOCUMENTS

FR 2 886 466 12/2006

* cited by examiner

*Primary Examiner* — Seung Lee
(74) *Attorney, Agent, or Firm* — Cozen O'Connor

(57) ABSTRACT

This circuit (32) comprises a first antenna (34) connected to the microcircuit (14) and capable of supplying power to the microcircuit (14) by electromagnetic coupling with an external terminal and a second antenna (36) electromagnetically coupled to the first antenna (34) while remaining electrically isolated from the latter. In addition, the first (34) and second (36) antennas consist respectively of first and second windings having opposite winding directions as defined from the same observation point.

17 Claims, 4 Drawing Sheets

MICROCIRCUIT DEVICE INCLUDING A NEAR-FIELD COMMUNICATION ANTENNA CIRCUIT

RELATED APPLICATIONS

This application claims the priority of French application no. 10/56398 filed Aug. 3, 2010, the content of which is hereby incorporated by reference.

BACKGROUND OF THE INVENTION

The present invention relates to the technical field of electronic devices of the contactless type comprising a near-field communication antenna for establishing communication with an external reader or possibly even read/write terminal.

Such devices are generally portable and wireless and are able to exchange data with the terminal by electromagnetic coupling.

The invention also applies to any type of portable or pocket electronic device incorporating such an antenna, such as a USB key, RFID (for Radio Frequency IDentification) tag, etc.

The invention applies more particularly but not exclusively to microcircuit cards equipped with an antenna, such as the so-called contactless cards allowing communication to be established without contact at a predefined communication frequency, for example the 13.56 MHz frequency defined by the ISO 14443 standard.

It also applies to so-called hybrid or dual cards which allow the establishment, in addition to contactless communication, of communication using contact through an external contact interface capable of making contact with a matching reader.

Generally, the device lacks an independent power supply. For its electrical power supply, the microcircuit includes two input terminals each connected to one of the ends of the antenna: to operate, it uses the magnetic field emitted by the external terminal. Thus, when the device is within the magnetic field of the terminal, a high-frequency voltage, called the supply voltage, is generated at the terminals of the microcircuit.

Generally, the supply and communication frequencies are distinct so as to avoid undesired interference which might harm the quality of the exchanged signals.

It is desirable to reduce the dimensions of the antenna to facilitate its incorporation into small platforms, such as for example a mobile telephone network identification card, also called a SIM card, in the ID-000 format.

The invention relates more particularly to cards or to portable electronic devices in which it is desired to reduce the dimensions of the antenna while still maintaining performance, particularly its range, that is the maximum distance between the portable electronic device and the reader that allows a communication session to be established.

To compensate for the reduction in performance of the antenna connected with the reduction in the effective area of the latter, it is generally known to incorporate an antenna gain amplifier into the substrate.

A chip device comprising an antenna connected to the chip and an antenna gain amplifier comprising a second antenna physically separate from the first antenna is known in the state of the art, particularly in the international application published under the number WO 2009/122010. In this document, the second antenna is arranged near the first antenna to allow energy transfer by coupling between the antennas.

As stated in this document, the second antenna allows improvement of the performance of the first antenna and thus to noticeably increase the latter's communication distance.

SUMMARY OF THE INVENTION

One object of the invention is to provide a portable electronic device comprising a near-field communication antenna with reduced dimensions with improved performance and low bulk.

To this end, one aspect of the invention is directed to a microcircuit device comprising a near-field communication antenna circuit comprising a first antenna connected to the microcircuit and able to feed the microcircuit by electromagnetic coupling with an external terminal and a second antenna electromagnetically coupled to the first antenna while remaining electrically isolated from the latter. The first and second antennas include first and second windings respectively having opposite winding directions as defined from the same observation point.

Due to the invention, the performance of the first antenna is optimized. Indeed, the relative arrangement of the antennas in opposite winding directions makes it possible to significantly increase the performance of the device, particularly in terms of range, that is the maximum distance allowing communication between the device and the external terminal.

A device according to an embodiment of the invention can additionally include one or more of the following features:
- the two antennas are arranged substantially facing each other in distinct, substantially parallel planes;
- the antenna circuit has a resonance frequency, when the microcircuit is inactive, which corresponds to a supply frequency of the microcircuit;
- the first antenna and the microcircuit constitute a first circuit oscillating at a first resonance frequency and the second antenna constitutes a second circuit oscillating at a second resonance frequency distinct from the first frequency;
- the first frequency is substantially equal to the resonance frequency of the antenna circuit;
- the second resonance frequency is greater than or equal to double the first resonance frequency;
- the first frequency is comprised between 10 and 20 MHz;
- the second frequency is greater than or equal to 30 MHz, preferably equal to 50 MHz;
- the second antenna is open, the two ends of the antenna being separated by an electrically insulating material;
- the second antenna closes on a capacitive element;
- the capacitive element consists of two metal plates separated from one another by an electrically insulating material, for example a substrate material of the second antenna;
- the first and second antennas consist of a winding of the first and second numbers of electrically conductive turns.

The antennas have the same number of turns;
- the antenna circuit is borne by a substrate delimiting two opposite faces; one of the faces bears the first antenna and the other face bears the second antenna;
- the device comprises a body provided with a cavity for receiving a microcircuit module, the module comprising a substrate bearing the microcircuit and the antenna circuit;
- the device is a microcircuit card the outside dimensions whereof are delimited by the body, for example of card in the ID-000 format.

DETAILED DESCRIPTION OF THE DRAWINGS

Figure 1:
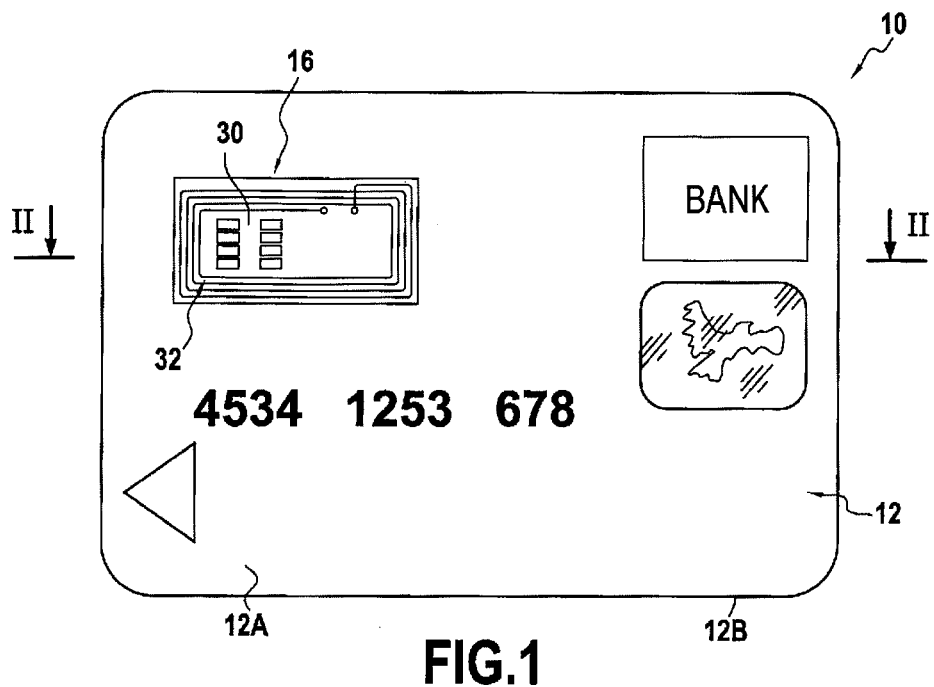
FIG. 1 shows a top view of a microcircuit device, such as a microcircuit card, according to a first embodiment of the invention.

A microcircuit device according to a first embodiment of the invention is shown in FIG. 1. This device is designated by the general reference number 10.

In the example described in this application, the microcircuit device 10 is a microcircuit card. As a variation, the device can be a passport page such as the cover of the passport or even a self-adhesive tag such as a "sticker."

As shown in FIG. 1, the device 10 comprises a body 12 in the general form of a card delimiting first 12A and second 12B opposite faces.

In this embodiment, the body 12 delimits the outside dimensions of the card 10. In this example and by preference, the dimensions of the card are defined by the ID-1 format of the ISO 7816 standard, which is the standard conventionally used for bank cards with dimensions of 86 mm by 54 mm. Of course, other card formats can also be used, such as the ID-000 format of the same standard in particular.

Preferably, the card body 12 is made by lamination, that is by constituting, by means of a press and in a hot laminating operation, a stack of laminated layers or sheets made of thermoplastic for example.

For example, in this embodiment, the body 12 comprises a stack of at least three layers: a central layer constituting the data printing layer interleaved between two external transparent layers. As a variation, the body can be made by casting, from plastic for example.

Conventionally, the device 10 comprises a microcircuit 14 capable of exchanging, of processing and/or of storing data in memory. In a preferred embodiment, the body 12 comprises a microcircuit module 16 incorporating the microcircuit 14. Preferably, all the electronic circuits of the device 10 are integrated into this single chip 14 or microcircuit.

Figure 2:
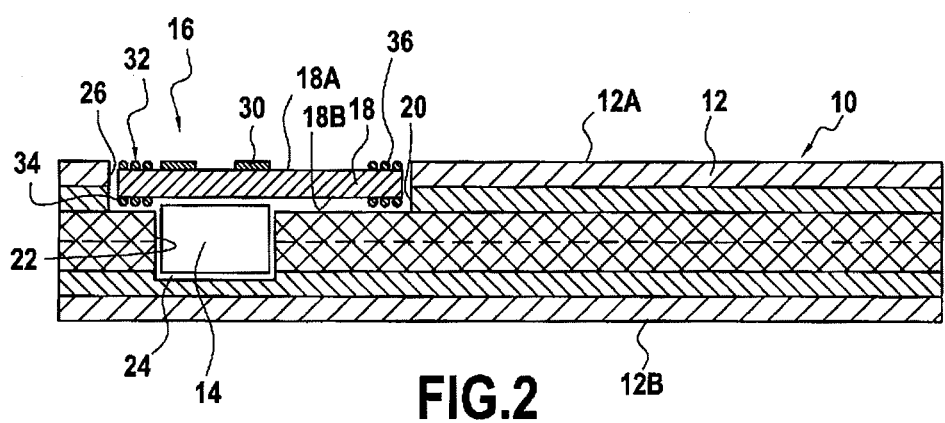
FIG. 2 shows a section view of the card of FIG. 1 along the line II-II.

In the example described, the module 16 comprises a substrate 18 bearing the microcircuit 14. Thus, as illustrated in FIG. 2, the substrate 18 delimits first 18A and second 18B opposite faces, called the outer face and the inner face respectively, the outer face 18A being oriented toward the outside of the card 10. The substrate 18 is for example made of epoxy type glass fiber, of polyester or of paper and has a thickness comprised for example between one hundred and two hundred micrometers.

In addition, in this example, as illustrated by FIG. 2, the body 12 comprises a cavity 20 for housing the module 16.

The cavity 20 comprises for example a deep central area 22 provided with a bottom 24 for housing the microcircuit 14 and a peripheral area 26 raised with respect to the central area 22 delimiting a terrace 28 with the bottom 24. This peripheral area 26 comprises a support surface that is raised with respect to the bottom of the cavity 20 on which rest the edges of the substrate 18 of the module 16.

Such a cavity 20 is generally obtained by machining, typically by milling or by spot facing in two operations:
a wide spot facing to form the peripheral area 26 corresponding to the depth of the terrace,
a narrow spot facing to form the deeper central area 24.

In order to communicate with an external terminal, the card 10 comprises for example an external interface 30 of contact pads electrically connected to the microcircuit 14. This interface 30 allows communication to be established by contact of the card 10, for example when the card 10 is inserted into a matching card reader.

This interface 30 comprises for example a series of metal electrical contact pads, complying with a predefined microcircuit card standard. For example, the contact pads are compliant with the ISO 7816 standard. In this embodiment, the contact pads of the interface 30 correspond to the contacts C1, C2, C3, C5, C6, C7 of the ISO 7816 standard.

The interface 30 of the card 10 is preferably made of a layer of metallic material such as copper but may also be made, as a variation, by silkscreen printing using conductive ink of the epoxy ink filled with silver or gold particles type, or by silkscreen printing of an electrically conductive polymer.

Preferably, the pads are electrically connected to the microcircuit 14 by electrically conductive wires (not shown) such as for example gold wires passing through vias provided in the substrate 18 of the module 16, connected in their turn to electrically conductive traces of connections extending over the inner face 18B of the substrate 18. These traces are not shown in FIG. 4.

In this embodiment, the card 10 is of the dual type, that is it comprises both a contactless interface capable of establishing near-field communication between an external terminal and an interface with contact capable of establishing communication with another external terminal by contact. However, as a variation, the card 10 can be solely of the contactless type. In this case, the card 10 is preferably not provided with the external contact interface 30.

To this end, to establish contactless communication with an external terminal such as an external reader, the device 10 also comprises a near-field communication antenna circuit 32.

The antenna circuit 32 comprises, in compliance with the invention, a first antenna 34 connected to the microcircuit 14 and capable of feeding the microcircuit 14 by electromagnetic coupling with the external terminal 100.

In the example described, the magnetic field B emitted by the external terminal 100 provides the energy provided for supplying the microcircuit 14 at a supply frequency fa and serves as a platform for data exchange between the microcircuit 14 and the terminal 100 at a communication frequency fc.

The supply frequency fa is preferably comprised between 14 and 20 MHz while the communication frequency fc corresponds preferably to the 13.56 MHz frequency defined by the ISO 14 443 standard.

For example, when the microcircuit 14 is in standby mode (that is not supplied with power; this is the case particularly when the microcircuit 14 is out of range of the terminal), the antenna circuit 32 is tuned to the supply frequency fa of the microcircuit 14.

Upon entering the magnetic field B of the external terminal 100, the antenna circuit 32 goes into resonance at the supply frequency fa and generates a voltage at the terminals 14A, 14B of the microcircuit 14 allowing activation of the latter. The microcircuit 14 thus fed tunes the resonance frequency of the antenna circuit 32 to the communication frequency fc, for example by varying an internal capacitive load.

Preferably the first antenna 34 comprises first 34A and second 34B ends connected respectively to the first 14A and second 14B input terminals of the microcircuit 14. These input terminals 14A, 14B consist for example of the connection studs of the microcircuit 14.

In addition, in conformity with the invention, the antenna circuit 32 comprises a second antenna 36 electromagnetically coupled with the first antenna 34 while remaining electrically isolated from the latter.

Figure 7:
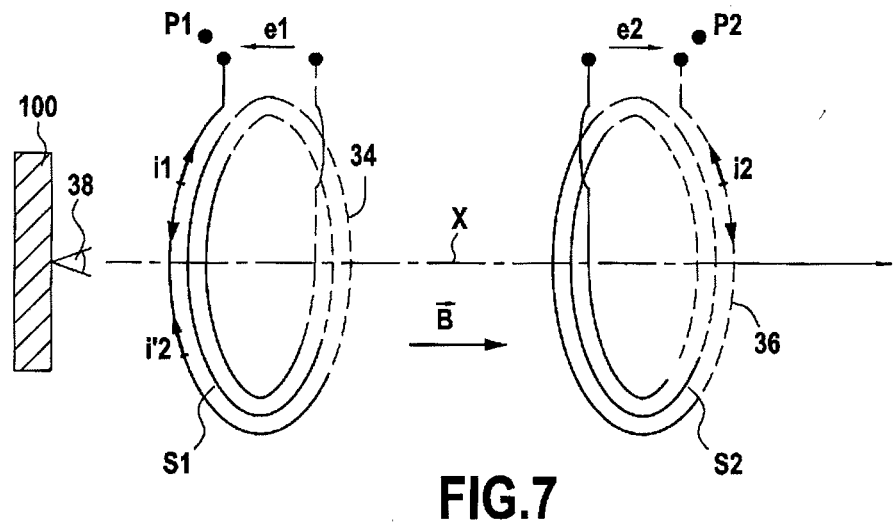
FIGS. 7 and 8 show schematically a near-field communication antenna circuit comprising two windings, wound in opposite directions and in identical directions respectively.

More particularly, the first 34 and second 36 antennas consist of first and second windings having opposite winding directions as defined from the same observation point 38 (FIG. 7).

Figure 8:
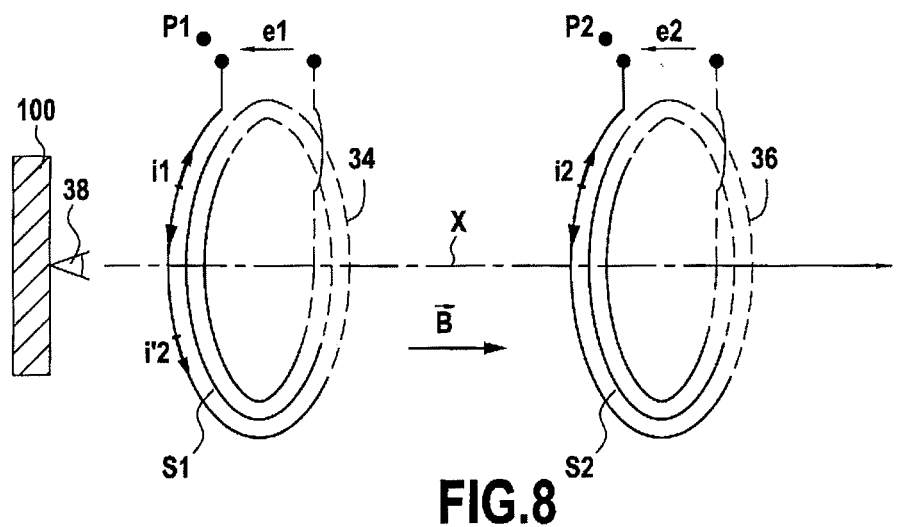

Thus, there is shown in FIG. 7 a schematic representing the antenna circuit 32 according to the invention in which the antennas 34 and 36 are wound in opposite directions and in FIG. 8 a schematic showing an antenna circuit in which the antennas are wound in the same direction, unlike the invention. In these figures, only three turns have been shown for each antenna 34, 36 for the sake of simplicity. Of course, the antennas 34, 36 can have a greater number of turns or fewer turns.

More precisely, the first antenna 34 is able to generate a voltage between the first 14A and second 14B input terminals by electromagnetic coupling to an external terminal 100. The voltage thus generated is in this example defined by the difference between the first and the second electrical potentials, respectively, of the first 14A and second 14B terminals.

In FIG. 7, the antennas 34 and 36 are wound around an axis X which is also the direction of the magnetic field B emitted by the terminal 100. A magnetic flux B, representing the quantity of the magnetic field B generated by the reader 100, runs through the two antennas 34 and 36, running perpendicularly the second S1, S2 of the antennas.

When a variable magnetic flux passes through the antennas 34 and 36 over a given time, an electrical voltage, also called an electromotive force, is generated at the terminals of each of the windings. In the example described, the electromotive force of the first winding 34 is designated e1 and the electromotive force of the second winding 36 is designated e2.

The polarity of the voltages at a given instant has also been shown by a polarity point located at one end of each antenna 34 and 36, labeled for example P1 for the first antenna 34 and labeled P2 for the second antenna 36.

The first point P1 is arbitrarily selected in this example for the first antenna 34 and the direction of the current i1 circulating in the first antenna 34 is determined by application of the generator convention known per se.

The orientations of the voltage e2 and current i2 of the second antenna 36 are then easily deduced from observation of the relative winding directions of the first 34 and second 36 antennas.

In the case of FIG. 8, the two windings have the same direction. In this case, the voltages and currents are identically oriented in the two windings.

In the case of the invention shown in FIG. 7, the first 34 and second 36 windings were wound in opposite directions and the relative orientations of the voltages and currents in the two windings are consequently opposite.

As the two antennas are placed in proximity to one another so that they are significantly coupled to allow energy transfer, a magnetic field B2 produced by the second antenna 36 also runs through the first antenna due to a phenomenon of mutual induction.

The total flux of the magnetic field at the first winding is therefore:

$$\phi = L \cdot i_1(t) + M \cdot i_2(t)$$

One skilled in the art will have noted that if the windings are wound in opposite directions, the magnetic field B2 produced by the second winding 36 is the cause of an additional electromotive force e2' and of the circulation of an induced current i2' in the first winding 34 in a direction identical to that of the current i1 induced by the field B.

Indeed, the electromotive force e2' generated by mutual induction of the second antenna 36 on the first antenna 34 has a sign that depend on the direction of circulation of the magnetic fluxes, that is on the winding direction of the antennas 34, 36, and therefore on the direction of the electromotive force e2 (and therefore of the electrical current i2 in the second antenna 36 because the direction of the current i2 and the direction of the voltage e2 are connected by the generator convention).

The total intensity of the current circulating in the first antenna 34 is therefore equal to the sum of the intensities of the current i1 and of the current i2'. This increase in intensity allows an improvement in the performance of the device 10, particularly in terms of range as well as the operating threshold of the microcircuit 14.

Preferably, the antennas 34 and 36 have the same number of turns. This makes it possible in particular to have optimal capacitive coupling between the two antennas.

Preferably, the first antenna 34 and the microcircuit 14 constitute a first oscillating circuit 40 at a first resonance frequency f1 and the second antenna 36 constitutes a second oscillating circuit 42 at a second resonance frequency f2 distinct from the first frequency f1.

The first resonance frequency f1 is preferably substantially equal to the antenna circuit 32 resonance frequency, for example when the microcircuit 14 is on standby or deactivated. Thus, the first resonance frequency f1 corresponds substantially to the supply frequency fa. The first frequency f1 is for example comprised between 14 and 30 MHz.

Preferably, the second frequency f2 is greater than or equal to double the first frequency f1 and is for example greater than 30 MHz, preferably equal to 50 MHz.

Due to this frequency difference, it is possible to adjust the first antenna 34 independently of the second antenna 36. Indeed, belonging to frequency ranges relatively distant from one another, the second frequency f2 does not interfere significantly with the first frequency f1.

Preferably, in order to optimize the mutual coupling of the two antennas 34 and 36, the latter are arranged facing in substantially opposite directions and in distinct but substantially parallel planes.

For example, the antenna circuit 32 is arranged in the microcircuit module 16 and is preferably borne by the substrate 18 of the module 16. Thus, in the first embodiment, the first antenna 34 is borne on one of the faces 18B of the substrate 18 and the second antenna 36 is borne on the other of the faces 18A of the substrate 18.

Figure 4:
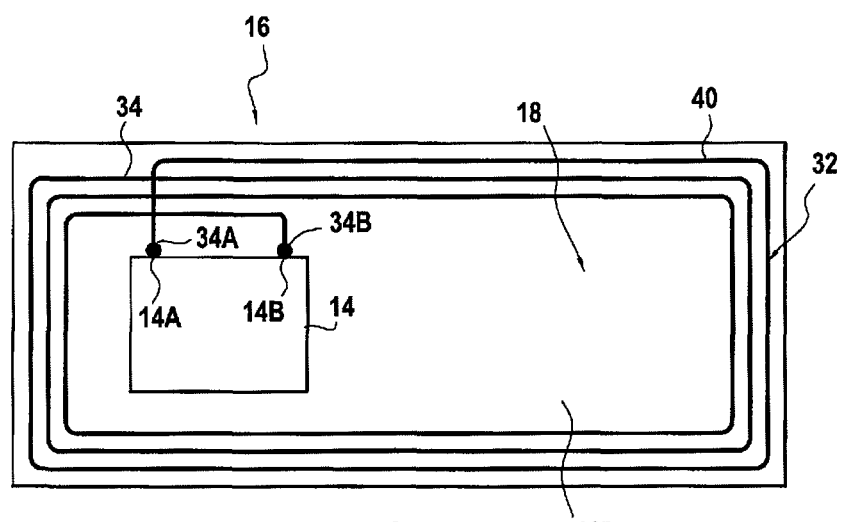

For example, as illustrated in FIG. 4, the first antenna 34 extends over the face 18B bearing the microcircuit 14. Preferably and in this embodiment, the antenna 34 extends over the periphery of the substrate 18 of the module 16.

Figure 3:
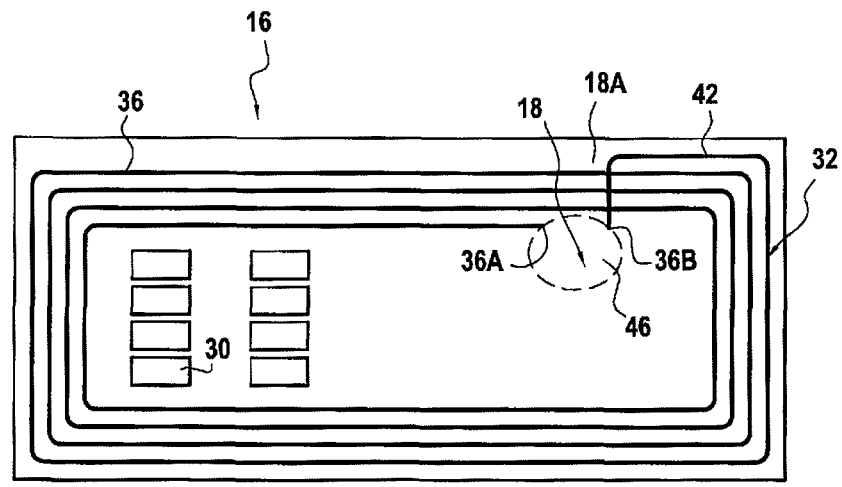
FIGS. 3 and 4 show top and bottom views, respectively, of a microcircuit module of the card of FIG. 1.

The second antenna 36 extends as illustrated in FIG. 3 over the first face 18A of the substrate 18, surrounding the interface 30.

The substrate 18 of the module 16 has for example a generally rectangular shape and the antennas 34 and 36 run along the periphery of the substrate 18. In the example illustrated in the figures, the substrate 18 has a generally oblong shape. The general shape of the antenna windings can vary according, for example, to the geometry of the substrate 18.

In this first embodiment illustrated by FIGS. 3 and 4, the second antenna 36 is open and the ends 36A, 36B of this antenna 36 are separated by an electrically insulating material, in order to form a capacitor 48 having low capacitance, possibly substantially zero capacitance, the ends 36A, 36B constituting the plates of this capacitor 48. In the example described, the substrate 18 comprises at least one area 46 made of the electrically insulating material arranged between the two ends of the second antenna 36 (FIG. 5) and preferably the substrate 18 is made entirely of this insulating material.

Conventionally, the capacitance of the capacitor 48 is proportional to the smaller of the two surface areas of the face-to-face plates. In this case, preferably, the surface area of each end 36A, 36B corresponds to the cross-section of the antenna 36.

In addition, conventionally, the capacitance of the capacitor 48 is smaller, the smaller the distance between the two plates. It is then possible to adjust the capacitance of this capacitor 48 by adjusting the different parameters which are the surface area of the ends and the separation distance of these two ends. Of course, the nature of the insulating material separating the two ends of the antenna can also have an effect on the value of the capacitance of the capacitor 48.

The resonance frequency f2 of the second oscillating circuit 42 is for example selected within a range of frequencies sufficiently distant from the resonance frequency f1 of the first oscillating circuit 30. The fact of having a very low capacitance makes it possible to obtain a relatively high resonance frequency f2, the latter being connected with the capacitance C and the inductance L of the antenna 36 by the relation, known per se:

$$f_2 = \frac{1}{2\pi\sqrt{LC}}$$

The value of the inductance L of the antenna 36 depends for example on the shape, the number of turns of the antenna, etc.

In this example, the antennas 34, 36 are for example made by etching copper. Possibly, as a variation, the antennas can be made by silkscreening, by a wiring technique, by an electrolysis technique, by a metal spraying technique, etc.

Figure 5:
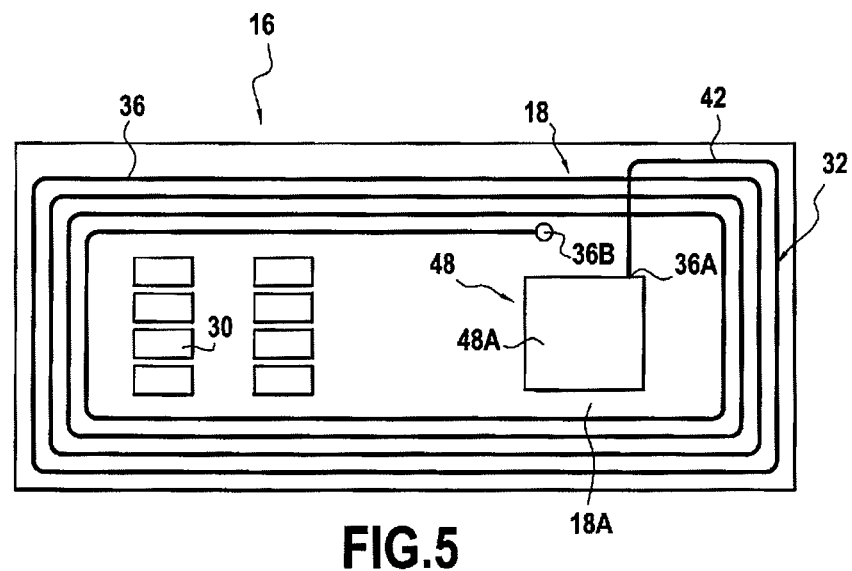
FIGS. 5 and 6 show top and bottom views, respectively, of the microcircuit module of the card of FIG. 1 according to a second embodiment of the invention.
Figure 6:
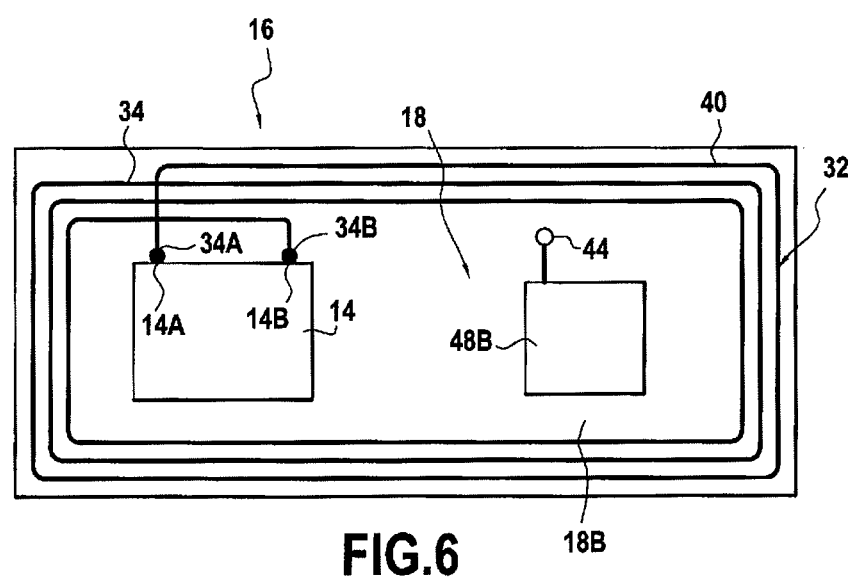

In the second embodiment illustrated in FIGS. 5 and 6, the second antenna 36 is closed over a capacitive element such as for example a capacitor 48. In this example, the capacitor 48 comprises two plates 48A, 48B arranged facing one another in a dielectric area of the device 10.

In this second embodiment, the condenser 48 is borne by the substrate 18 of the module 16. For example, the two plates 48A, 48B extend in two substantially parallel planes of the substrate 18 of the module 16.

Preferably, the first 48A and second 48B plates of the capacitor 48 are made by depositing a metallic material on each face of a layer or a stack of layers constituting the substrate 18. The substrate is made for example of an electrically insulating material having good dielectric properties. Many plastics (polyimide for example) or other materials (particularly glass-epoxy) known to those skilled in the art are suited to this application.

As illustrated in these figures, the plates 48A, 48B extend for example facing each other on the first 18A and second 18B faces of the substrate 18 and the substrate 18 constitutes the dielectric substrate. The first 48A and second 48B plates are respectively connected to the first 36A and second 36B ends of the second antenna 36.

As illustrated in FIGS. 5 and 6, the plate 48B is connected to the end 36B of the antenna 36 by an electrically conductive via running through the substrate 18.

The capacitance of the capacitor 48 as well as the configuration of the second antenna 36 (shape, number of turns, etc.) are selected so that the resonance frequency f2 of this oscillating circuit 42 is comprised within a range sufficiently distant from the resonance frequency f1 of the first oscillating circuit 40 as was explained above.

The principal aspects of the operation of the device of FIGS. 1 through 8 will now be described.

Initially, the card 10 is out of range of the magnetic field generated by the external terminal 100. A person carrying the card 10 brings for example the latter close to the terminal 100.

When the card 10, initially out of range of the magnetic field generated by the external terminal, is placed in the magnetic field generated by that terminal 100, the antenna circuit 32 goes into resonance at the supply frequency fa of the microcircuit 14 which corresponds substantially to the resonance frequency f1 of the first oscillating circuit 40.

The presence of the second antenna 36 makes possible an increase in the current supplying the microcircuit and hence an improvement in the performance of the device 10, particularly the range, that is to say the maximum distance allowing establishment of communication between the reader and the card, and its operating threshold.

Once supplied with power, the microcircuit 14, initially in the standby or inactive mode, then switches to active mode and tunes the resonance frequency of the antenna circuit 32, for example by adjusting the value of its internal capacitance, to the communication frequency fc.

It is of course understood that the embodiments that have just been described have no limiting character and that they could undergo any desirable modification without thereby departing from the scope of the invention. In particular, it would be in conformity with the invention to incorporate the antenna and the microcircuit directly into a card body and not only into an electronic module. It would still be in conformity with the invention to incorporate the antennas or at least one of the antennas into the card body and the microcircuit into the electronic module.

The invention claimed is:

1. A microcircuit device comprising a near-field communication antenna circuit comprising:
   an antenna connected to a microcircuit of the device and configured to supply to the microcircuit power provided to the antenna by an external terminal at a supply frequency of the microcircuit; and
   a coupled coil inductively coupled with a coil of the antenna while still remaining electrically isolated from the antenna, the coil of the antenna and the coupled coil having opposite winding directions as defined from the same observation point.

2. The device according to claim 1, wherein the coil of the antenna and the coupled coil are arranged substantially facing each other in distinct but substantially parallel planes.

3. The device according to claim 1, wherein the antenna and the microcircuit comprise a circuit oscillating at a first resonance frequency and the coupled coil comprises a second circuit oscillating at a second resonance frequency distinct from the first frequency such that the first resonance frequency is independent of the coupled coil.

4. The device according to claim 3, wherein the first resonance frequency is substantially equal to the resonance frequency of the antenna circuit.

5. The device according to claim 3, wherein the second resonance frequency is greater than or equal to double the first resonance frequency.

6. The device according to claim 3, wherein the first resonance frequency is comprised between 10 and 20 MHz.

7. The device according to claim 3, wherein the second resonance frequency is greater than or equal to 30 MHz.

8. The device according to claim 3, wherein the second frequency is equal to 50 MHz.

9. The device according to claim 1, wherein the coupled coil is open, two ends of the coupled coil being separated by an electrically insulating material.

10. The device according to claim 1, wherein the coupled coil is closed on a capacitive element.

11. The device according to claim 10, wherein the capacitive element comprises two metal plates separated from one another by an electrically insulating material.

12. The device according to claim 11, wherein the electrically insulating material is a material of a substrate of the coupled coil.

13. The device according to claim 1, wherein the coil of the antenna and the coupled coil have the same number of electrically conductive turns.

14. The device according to claim 1, wherein the antenna circuit is borne on a substrate delimiting two opposite faces; one face of the two opposite faces bears the antenna, and another face of the two opposite faces bears the coupled coil.

15. The device according to claim 1, further comprising:
a body provided with a cavity for receiving a microcircuit module, the module comprising a substrate bearing the microcircuit and the antenna circuit.

16. The device according to claim 1, wherein the device is a microcircuit card having outside dimensions which are delimited by its body.

17. The device according to claim 16, wherein said microcircuit card is in an ID-000 format.

* * * * *